(12) United States Patent
Donmez et al.

(10) Patent No.: US 9,455,851 B1
(45) Date of Patent: Sep. 27, 2016

(54) EFFICIENT ENCODING/DECODING ALGORITHM FOR MTS CONSTRAINED MFSK COMMUNICATIONS

(71) Applicant: TEXAS INSTRUMENTS INCORPORATED, Dallas, TX (US)

(72) Inventors: Mehmet Ali Donmez, Champaign, IL (US); Anand Ganesh Dabak, Plano, TX (US); Il Han Kim, Allen, TX (US); Timothy Mark Schmidl, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/969,227

(22) Filed: Dec. 15, 2015

Related U.S. Application Data

(60) Provisional application No. 62/236,549, filed on Oct. 2, 2015, provisional application No. 62/236,579, filed on Oct. 2, 2015.

(51) Int. Cl.
 *H04B 11/00* (2006.01)
 *H04L 27/12* (2006.01)
 *H04L 27/144* (2006.01)

(52) U.S. Cl.
 CPC ........... *H04L 27/122* (2013.01); *H04L 27/144* (2013.01)

(58) Field of Classification Search
 CPC .. H04B 10/00; H04B 10/548; H04B 10/556; H04B 10/5563; H04L 11/00
 USPC ....... 375/305, 265, 295, 316, 260, 270, 271, 375/272, 274, 275, 278, 285, 334, 335, 336, 375/302, 303
 See application file for complete search history.

(56) References Cited

U.S. PATENT DOCUMENTS

| | | | | |
|---|---|---|---|---|
| 3,330,909 A | * | 7/1967 | Willson | H04B 14/02 370/298 |
| 4,045,767 A | * | 8/1977 | Nishihara | H04L 27/30 324/76.31 |
| 5,546,359 A | * | 8/1996 | Aarseth | E21B 47/18 367/134 |
| 2014/0050321 A1 | * | 2/2014 | Albert | H04W 12/04 380/270 |

OTHER PUBLICATIONS

Luo et al., "On Approaching Wideband Capacity Using Multitone FSK," IEEE Journal on Selected Areas in Communications, vol. 23, No. 9, pp. 1830-1838 (Sep. 2005).
Scussel et al., "A New MFSK Acoustic Modem for Operation in Adverse Underwater Channels," IEEE 0-7803-4108-2/97, pp. 247-254 (1997).
Meybodi et al., "Feasibility of Communication Among Pumps in a District Heating System," IEEE pp. 1-11 (2010).

(Continued)

*Primary Examiner* — Siu Lee
(74) *Attorney, Agent, or Firm* — John R. Pessetto; Frank D. Cimino

(57) ABSTRACT

A method of encoding a data signal is disclosed. The method includes selecting a set of M ultrasonic frequencies, wherein each of the M ultrasonic frequencies differs from an adjacent frequency by at least a first frequency spacing, and wherein M is a positive integer. The method further includes forming a trellis matrix and encoding the data signal with the trellis matrix to form a set of Q of the M ultrasonic frequencies, wherein Q is a positive integer less than M, and wherein a minimum frequency separation between any pair of the Q frequencies of the set is greater than the first frequency spacing.

20 Claims, 14 Drawing Sheets

(56) References Cited

OTHER PUBLICATIONS

Hosman et al., "Design and Characterization of an MFSK-Based Transmitter/Receiver for Ultrasonic Communication Through Metallic Structures," IEEE Trans. on Instrumentation and Measurement, vol. 60, No. 12, pp. 3767-3774 (Dec. 2011).

Hosman et al. "Multi-Tone FSK for Ultrasonic Communication," OK Conference (2007).

Henkel et al., The Acoustical Channel the Transfer Function of Water Pipes, http://hyperphysics.phy-astr.gsu.edu/hbase/tables/soundv.html, pp. 1-19 (1998).

Sakuma et al., "Two-way communication over gas pipe-line using multicarrier modulated sound waves with cyclic frequency shifting," Acoust. Sci. & Tech. 27, 4 pp. 225-232 (2006).

Chakraborty et al., "Low-rate Ultrasonic Communication Axially along a Cylindrical Pipe," IEEE International Ultrasonics Symposium Proceedings, pp. 547-551 (2014).

Haynes et al., "Ultrasonic Communication Project, Phase 1, FY 1999," Y/NSP-252, pp. 1-108 (Jun. 2000).

Telatar et al., "Capacity and Mutual Information of Wideband Multipath Fading Channels," IEEE Trans.on Information Theory, vol. 46, No. 4, pp. 1384-1400 (Jul. 2000).

\* cited by examiner

| MTS CONSTRAINT | SER @5m | SER @10m | SER @14m | RATE (bits/s) |
|---|---|---|---|---|
| 0 kHz | 0.555 | 0.607 | 0.554 | 575 |
| 1 kHz | 0.239 | 0.296 | 0.316 | 563 |
| 2 kHz | 0.191 | 0.260 | 0.256 | 546 |
| 3 kHz | 0.165 | 0.188 | 0.212 | 527 |
| 4 kHz | 0.133 | 0.125 | 0.137 | 505 |
| 5 kHz | 0.082 | 0.073 | 0.073 | 480 |

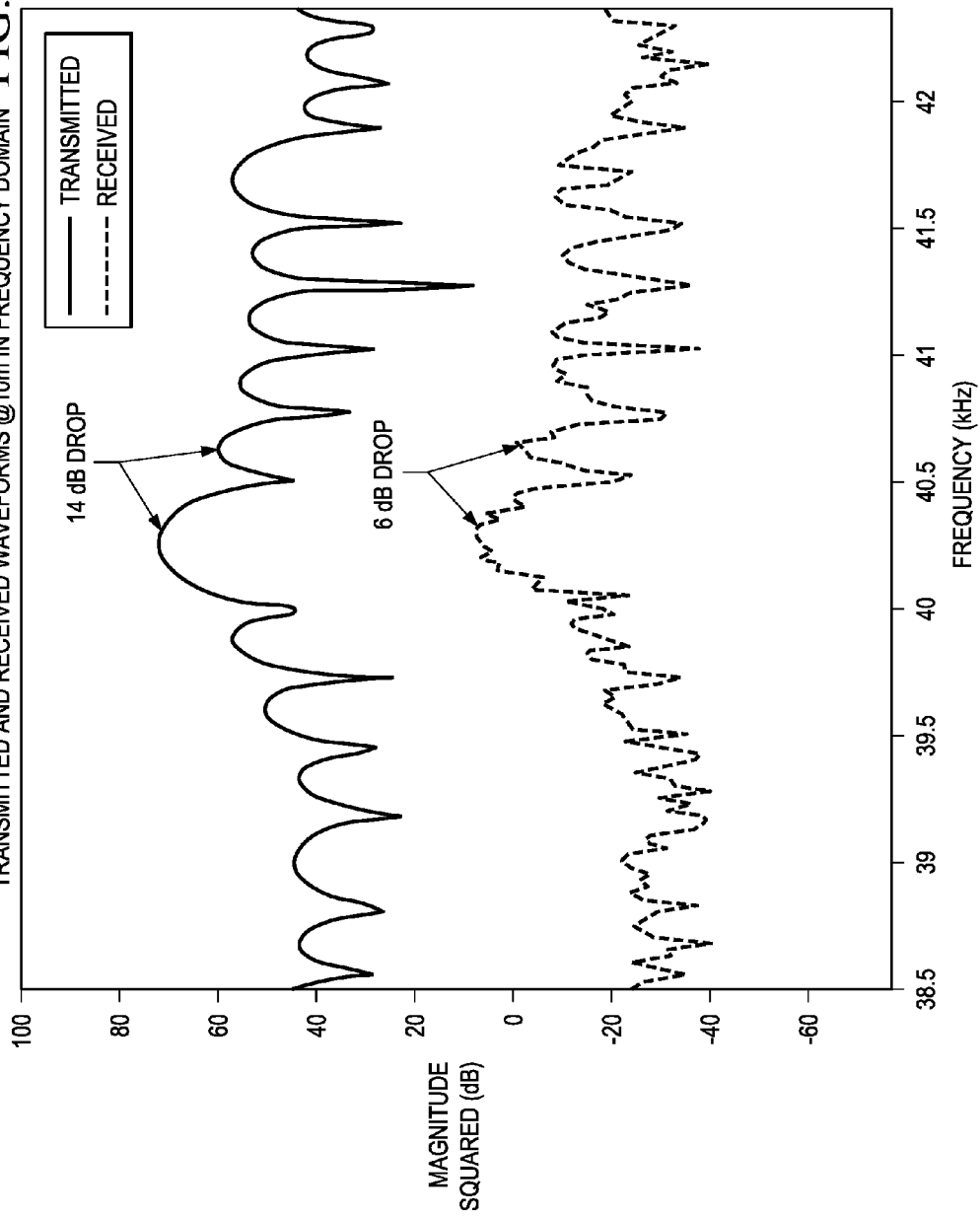

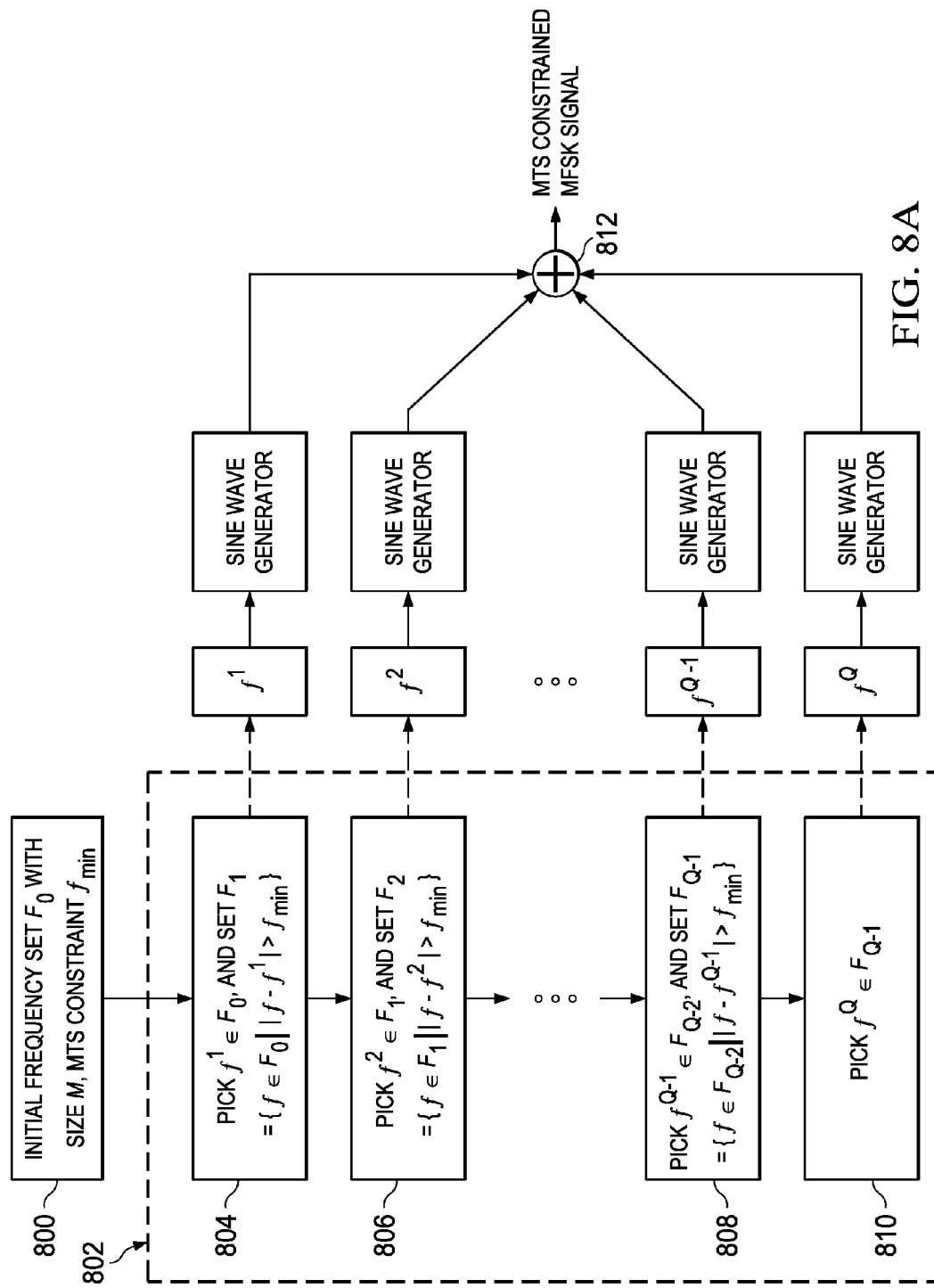

US 9,455,851 B1

EFFICIENT ENCODING/DECODING ALGORITHM FOR MTS CONSTRAINED MFSK COMMUNICATIONS

CROSS-REFERENCES TO RELATED APPLICATIONS

This application claims the benefit under 35 U.S.C. 119(e) of U.S. Provisional Application No. 62/236,549, filed Oct. 2, 2015, and of U.S. Provisional Application No. 62/236,579, filed Oct. 2, 2015, both of which are incorporated by reference herein in their entirety.

BACKGROUND OF THE INVENTION

Embodiments of the present invention relate to encoding data signals for ultrasonic communication through a multipath fading channel.

Ultrasound technology has been developed for practical applications such measuring fluid velocity in a pipe, measuring characteristics of a pipe and of fluid in the pipe, ultrasonic communication through various media such as metal pipes, underwater acoustic measurements, medical applications, and numerous other applications.

Referring to FIG. 1, for example, Hosman et al., "Design and Characterization of an MFSK-Based Transmitter/Receiver for Ultrasonic Communication Through Metallic Structures," IEEE Trans. On Instrumentation and Measurement, Vol. 60, No. 12, pp. 3767-3774 (December 2011) disclose an ultrasonic communication system for communicating through steel corner posts of shipping containers, which is incorporated herein by reference in its entirety. The communication system transmits multitone frequency-shift keyed (MFSK) data through the steel corner posts by means of attached ultrasonic transducers to a receiver external to the shipping containers. The steel corner posts are characterized as a metal multipath fading channel. Hosman et al. employ an MFSK encoding system as shown at FIG. 2. A data word is applied to a symbol encoder to selectively apply frequencies $f_0$ through $f_{N-1}$ to a sum circuit. The selected frequencies are then applied to an ultrasonic transducer for transmission through the steel corner posts. The MFSK system of Hosman et al. uses different combinations of Q summed tones from N available tones to produce $$\binom{N}{Q}$$

MFSK symbols, where $$\binom{N}{Q}$$

is defined as $N!/(Q!(N-Q)!)$. MFSK encoding advantageously produces substantially more encoded symbols than traditional frequency shift keyed (FSK) encoding as shown at FIG. 3. Here, for example, N=32 available tones will encode 5 bits ($\log_2(32)$) in each FSK symbol. By way of comparison, MFSK will encode 29 bits or the integer portion of $$\log_2\binom{N}{Q} \text{ for } Q = 16.$$

This results in a significantly higher data rate for MFSK encoding with the same number of available tones. The present inventors have realized a need to improve communication techniques through the multipath fading channel to further improve data throughput and reduce symbol error rate (SER). Accordingly, the preferred embodiments described below are directed toward improving upon the prior art.

BRIEF SUMMARY OF THE INVENTION

In a first embodiment of the present invention, a method of encoding a data signal is disclosed. The method includes selecting a set of M ultrasonic frequencies, wherein each of the M ultrasonic frequencies differs from an adjacent ultrasonic frequency by at least a first frequency spacing. The method further includes forming a trellis matrix and encoding the data signal with the trellis matrix to form a set of Q of the M ultrasonic frequencies, wherein Q is a positive integer less than M, and wherein a minimum frequency separation between any pair of the Q frequencies of the set is greater than the first frequency spacing.

In a second embodiment of the present invention, a method of decoding a set of Q ultrasonic frequencies is disclosed. The method includes selecting a set of M ultrasonic frequencies, wherein each of the M ultrasonic frequencies differs from an adjacent frequency by at least a first frequency spacing, and wherein M is a positive integer. The method further includes forming a trellis matrix and receiving the set of Q of the M ultrasonic frequencies, wherein Q is a positive integer less than M, and wherein a minimum frequency separation between any pair of the Q frequencies of the set is greater than the first frequency spacing. The set of Q frequencies is decoded with the trellis matrix to form a data signal In a third embodiment of the present invention, an encoding circuit is disclosed. The circuit comprises a plurality of sine wave generators arranged to produce a respective plurality of M ultrasonic frequencies, wherein each of the M frequencies differs from an adjacent frequency by at least a first frequency spacing, and wherein M is a positive integer. An encoder is arranged to encode a data signal to form a set of Q signals to select Q of the sine wave generators, wherein Q is a positive integer less than M, and wherein a minimum frequency separation between any pair of the Q selected sine wave generator frequencies of the set is greater than the first frequency spacing.

BRIEF DESCRIPTION OF THE SEVERAL VIEWS OF THE DRAWING

FIG. 5B is a diagram comparing the frequency domain of a 40.25 kHz transmitted waveform with a corresponding frequency domain of the waveform received through a 10 meter copper pipe;

FIG. 8A is a flow diagram showing multitone frequency-shift keyed (MFSK) encoding of data with minimum tone separation (MTS) according to the present invention;

DETAILED DESCRIPTION OF THE INVENTION

The preferred embodiments of the present invention provide significant advantages in symbol error rate (SER) and resulting data throughput of ultrasonic transmission through various conducting media over methods of the prior art as will become evident from the following detailed description.

Figure 4:
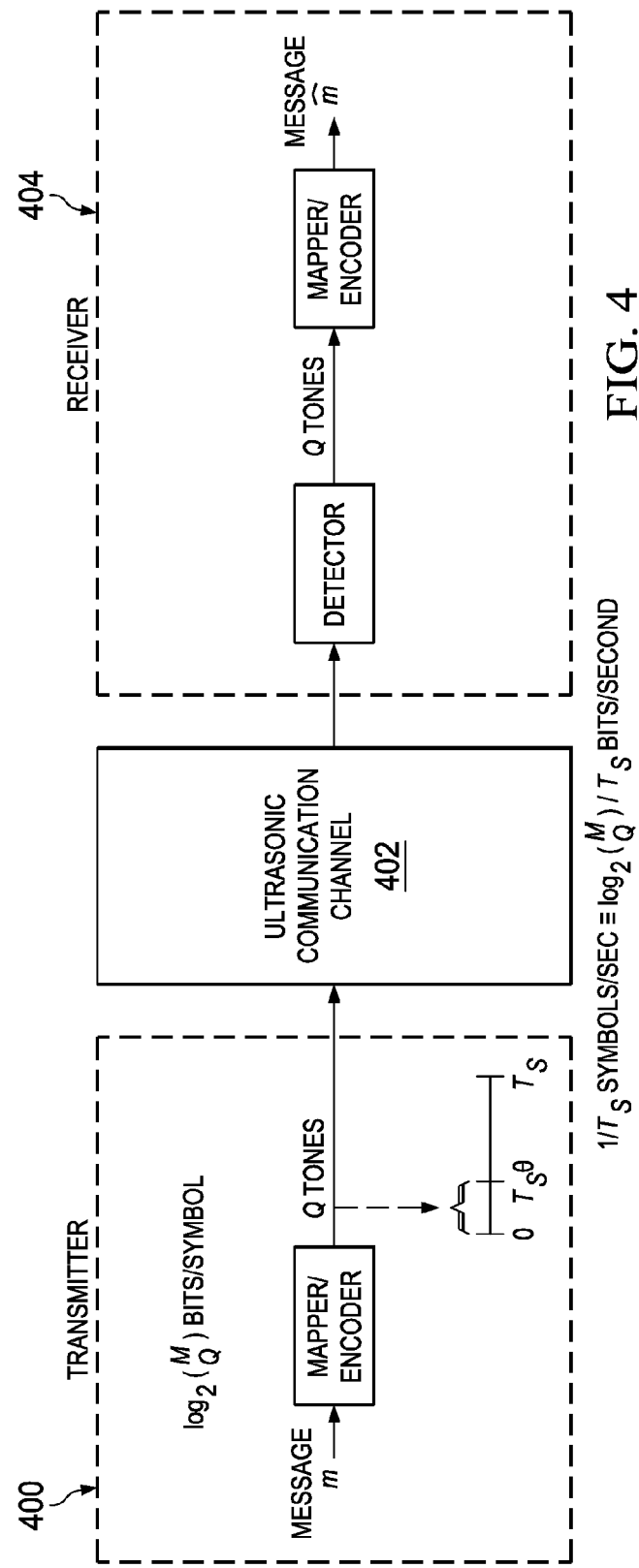
FIG. 4 is a diagram of an ultrasonic communication system of the present invention.

Referring to FIG. 4, there is a simplified diagram of an ultrasonic communication system of the present invention. The system includes a transmitter 400 and receiver 404 communicating through an ultrasonic communication channel 402. The ultrasonic communication channel may be solid, fluid or gas media and may be situated in an environment where wired or wireless communication is difficult. For example, the ultrasonic communication channel 402 may be a metal pipe that was previously installed in a commercial or residential complex, a buried pipe or conduit for fluid or gas transmission, a metal frame or support structure, or other conducting media. Moreover, the media may be a plastic material such as polyvinyl chloride (PVC), polyethylene (PE), or other conducting media. The present inventors have determined that a wide variety of conducting media may be characterized as a multipath fading channel for conducting ultrasonic signals.

Transmitter 400 includes a multitone frequency-shift keyed (MFSK) mapper and encoder as will be explained in detail. The transmitter receives a message m, which is preferably a sequence of N-bit data words, where N is a positive integer. The communication system employs a selected set of M available tones, where M is a positive integer. The M tones or frequencies may be spaced apart in a linear manner by a minimum frequency spacing $\Delta f$. A set of Q of the tones are selected subject to minimum tone separation (MTS) from the set of M tones to encode each N-bit data word, where N is less than or equal to an integer part of $$\log_2 \binom{M}{Q}.$$

The selected Q tones representing an N-bit data word are subsequently transmitted during a symbol time Ts having a duty cycle $\theta$ by a first ultrasonic transducer (not shown) attached to the conductive media. Data throughput of the system, therefore, is 1/Ts symbols/second or $$\log_2 \binom{M}{Q} / T_S$$

bits/second. Receiver 404 receives the Q tones by a second ultrasonic transducer (not shown) attached to the conductive media. Receiver 404 includes a noncoherent MFSK detector and mapper/decoder circuit. The receiver uses a fast Fourier transform (FFT) based peak detector tuned to each of the M frequencies. Q of the M frequencies are detected in the received signal. They are mapped and decoded to produce the sequence of N-bit data words and reconstruct decoded message m̂.

Figure 5A:
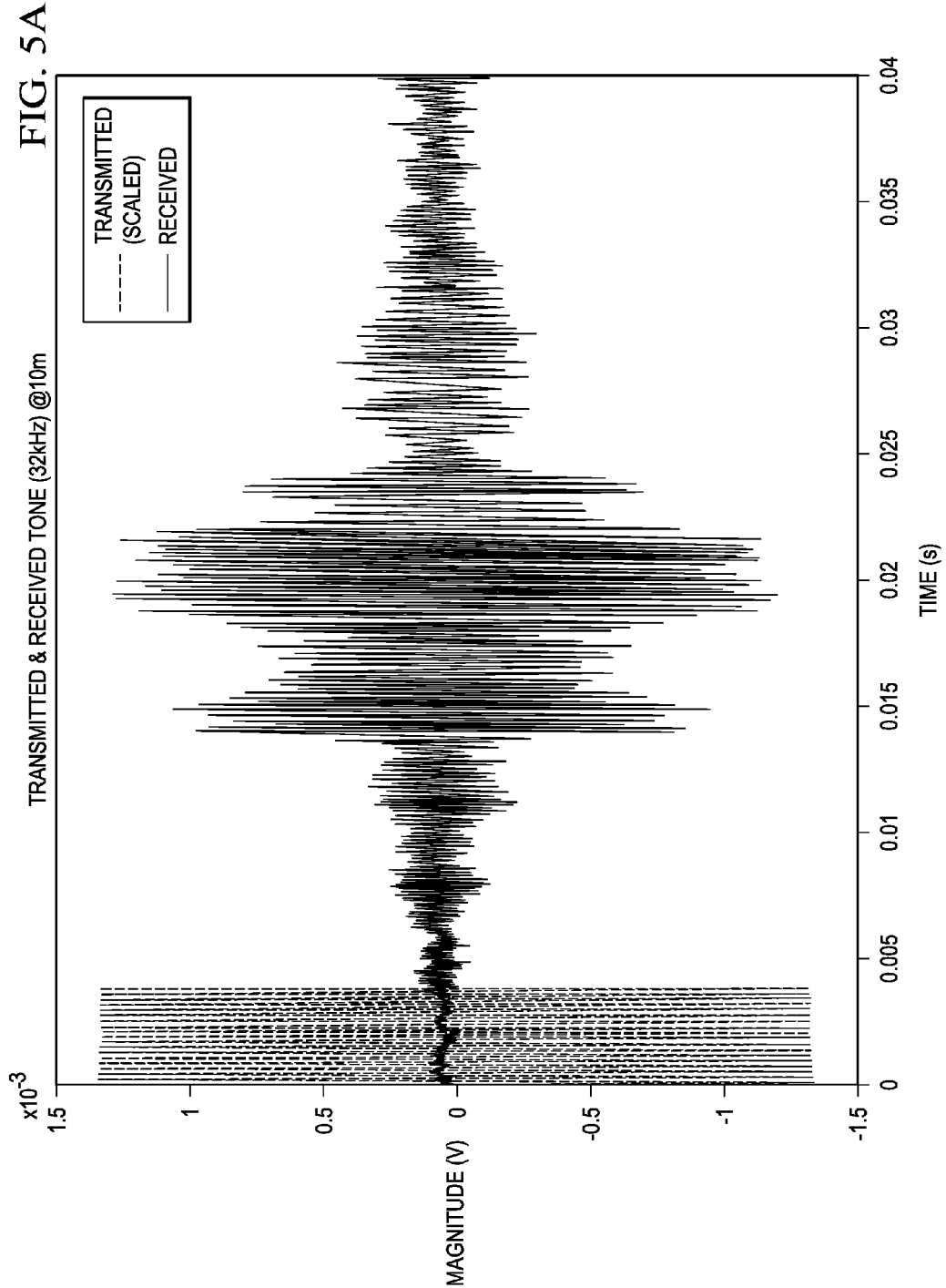
FIG. 5A is a diagram comparing a 32 kHz transmitted waveform with a corresponding waveform received through a 10 meter copper pipe.

Turning now to FIG. 5A, there is a diagram comparing a transmitted 32 kHz sinusoidal waveform with a corresponding waveform received through a 10 meter copper pipe. The transmitted signal has a peak-to-peak voltage of 10 V and is scaled for comparison with the 1.3 mV peak-to-peak voltage of the received signal. The received signal illustrates severe multipath fading that may occur in complex ultrasonic structures. The magnitude of the adjacent side lobes of the received signal are only slightly less than the primary received signal. When superimposed on other of the Q tones in an N-bit data word, this may lead to detection problems and an increased symbol error rate (SER) at the receiver.

FIG. 5B is a diagram comparing the frequency domain of a 40.25 kHz transmitted waveform with a corresponding frequency domain of the waveform received through a 10 meter copper pipe. The diagram illustrates a first side lobe of the transmitted signal at 40.55 kHz is 14 dB less than the magnitude of the transmitted signal at 40.25 kHz. However, the first side lobe of the received signal is only 6 dB less than the magnitude of the received signal at 40.25 kHz. This is primarily because the multipath channel does not equally attenuate each frequency. The receiver, therefore, may confuse a real peak of one of the Q transmitted tones with a side lobe of another tone of the Q transmitted tones. This results in a detection errors and an increased SER.

Figure 1:
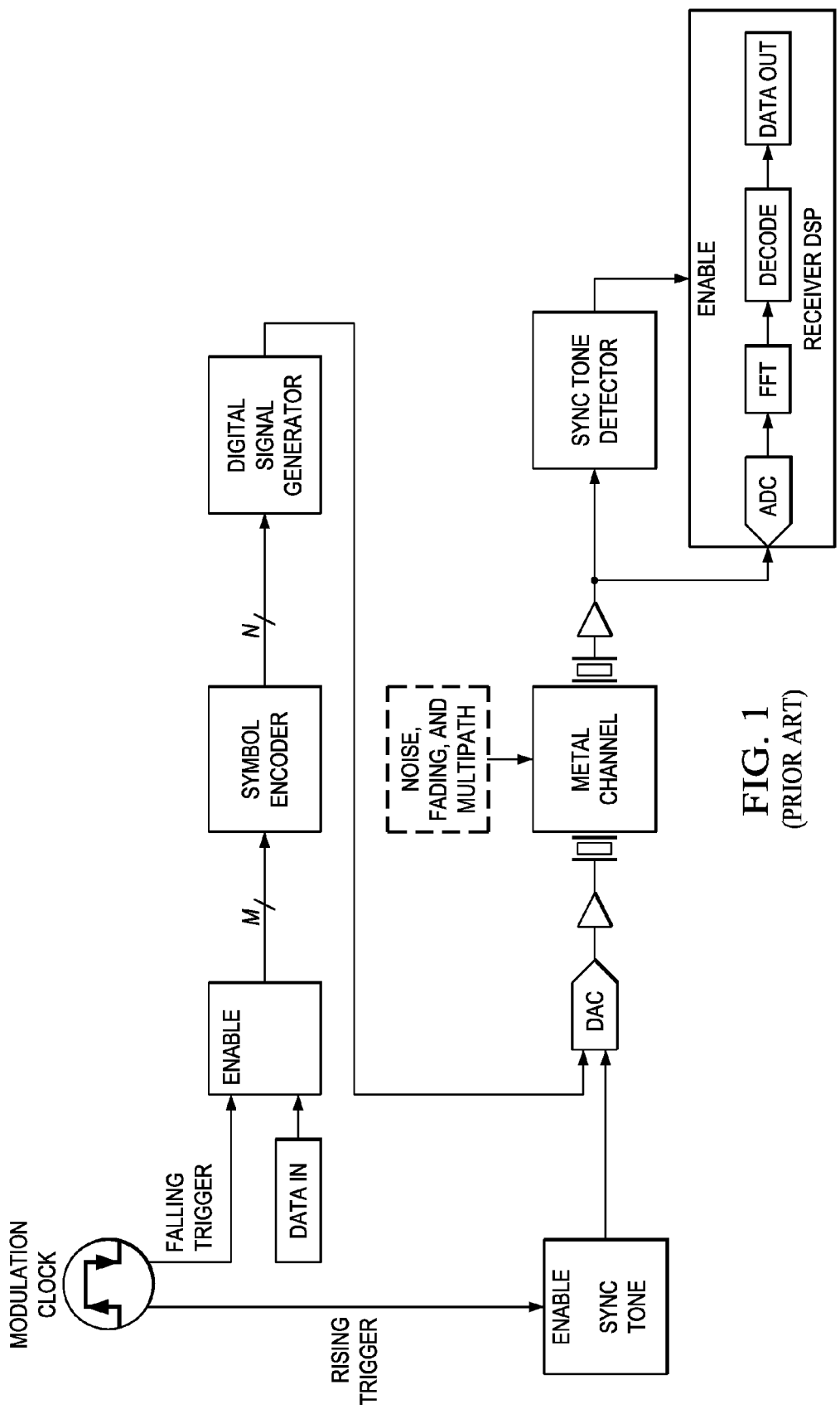
FIG. 1 is a simplified diagram of an ultrasonic communication system of the prior art.
Figure 2:
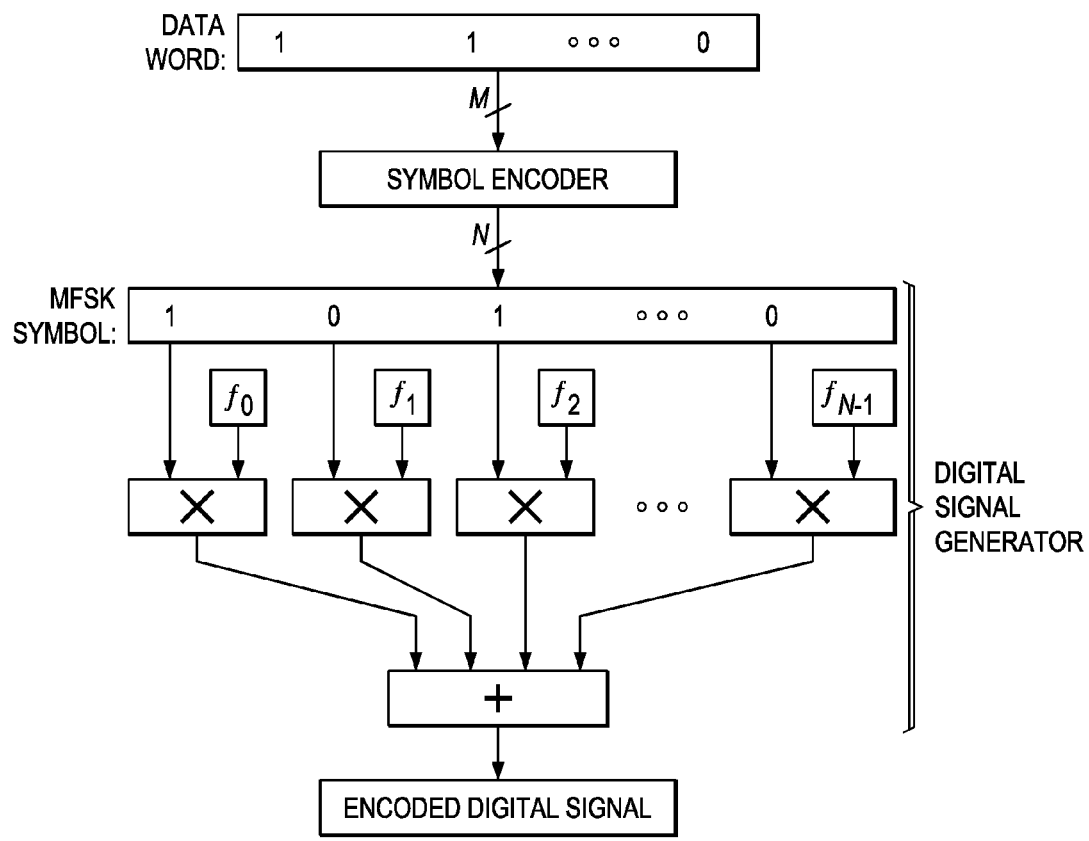
FIG. 2 is a multitoned frequency-shift keyed (MFSK) encoding system of the prior art.
Figures 3, 6A:
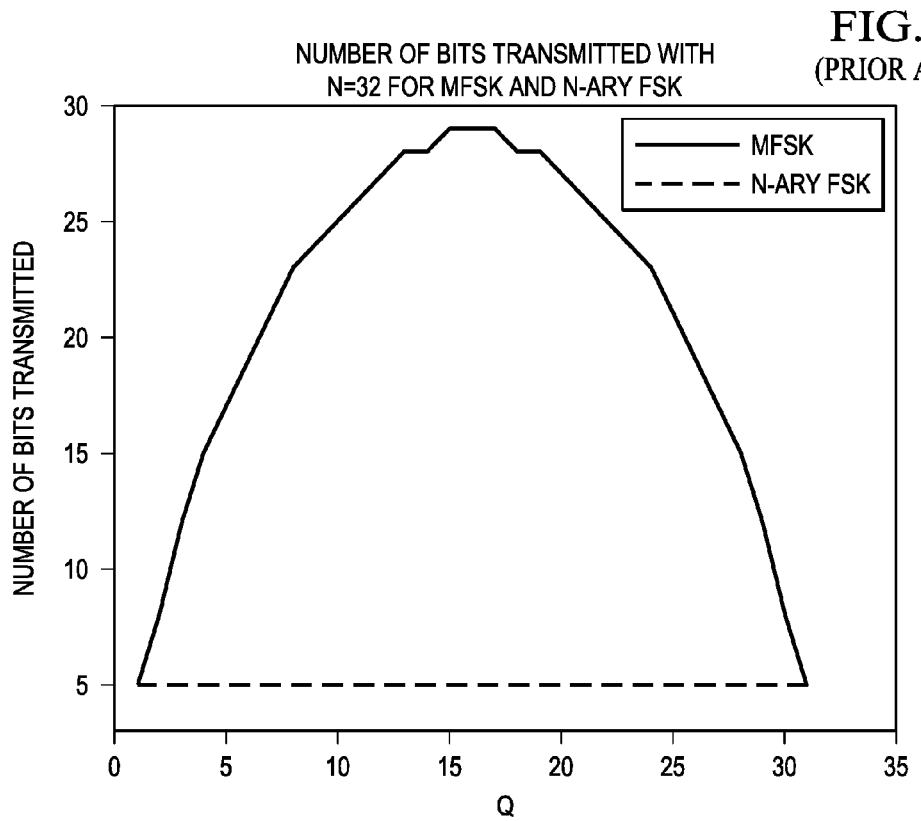
FIG. 3 is a diagram comparing frequency-shift keyed (FSK) bits/symbol to multitoned frequency-shift keyed (MFSK) bits/symbol as a function of Q of N available tones.
FIG. 6A is a table showing symbol error rate (SER) and throughput as a function of minimum tone separation (MTS)

The present inventors have determined that significant a reduction in SER is possible with only a small reduction in data throughput by implementing a minimum tone spacing (MTS) within the set of Q selected tones representing a data word. This is illustrated by the table of FIG. 6A. The inventors applied the MFSK system of FIG. 4 to a 10 meter copper pipe having a 2.5 cm diameter. An alphabet size of M=120 available tones was used with a set of Q=4 tones in each symbol. This provides the integer part of $$\log_2 \binom{120}{4} = 22 \text{ bits/symbol.}$$

The selected ultrasonic frequency set F was 31.75 kHz+ (k*0.25) kHz, where k=1, 2, . . . 120. This provides an available frequency range of set M from 32 kHz to 61.75 kHz in 0.25 kHz steps. Referring again to FIG. 6, the left column shows the MTS constraint from 0 kHz to 5 kHz in 1 kHz steps. The first row with 0 kHz MTS indicates no additional tone separation, and the Q tones of a symbol may be separated by the 0.25 kHz space of frequency alphabet M. For this implementation without additional MTS the data rate is 575 bits/second. The symbol error rate (SER) for a transmitter-to-receiver transducer space of 5 meters was 0.555. The SER of the first row for transmitter-to-receiver transducer spaces of 10 meters and 14 meters was 0.607 and 0.554, respectively. The SER, therefore, was relatively unchanged in the indicated range of transducer space.

The second row illustrates results for an MTS constraint of 1 kHz. Here, the Q tones of a symbol must be separated by at least 1 kHz. For this implementation the data rate is slightly reduced to 563 bits/second. The SER of the second row, however, is significantly less than in the first row. For transmitter-to-receiver transducer spaces of 5, 10, and 14 meters, the SER was 0.239, 0.296, and 0.316, respectively. The SER, therefore, was relatively unchanged in the indicated range of transducer space. However, the average SER of the second row was 0.284 compared to an average SER of 0.572 for the first row without MTS. The second row SER was advantageously less than half the first row SER with only a 2% reduction in throughput.

The third row illustrates results for an MTS constraint of 2 kHz. Here, the Q tones of a symbol must be separated by at least 2 kHz. For this implementation the data rate is slightly reduced to 546 bits/second or 5% less than the first row. The SER of the third row, however, is significantly less than in the first or second rows. For transmitter-to-receiver transducer spaces of 5, 10, and 14 meters, the SER was 0.191, 0.260, and 0.256, respectively. The average SER of the third row was 0.236 compared to an average SER of 0.572 for the first row without MTS. This is a 59% decrease in SER with respect to the first row with only a 5% reduction in throughput. The SER is seen to decrease in subsequent rows with increasing MTS. In the fifth row for an MTS constraint of 5 kHz, the average SER is 0.76 for an 87% decrease in average SER. The throughput, however, is 480 bits/second for a throughput reduction of 17%.

Figure 6B:
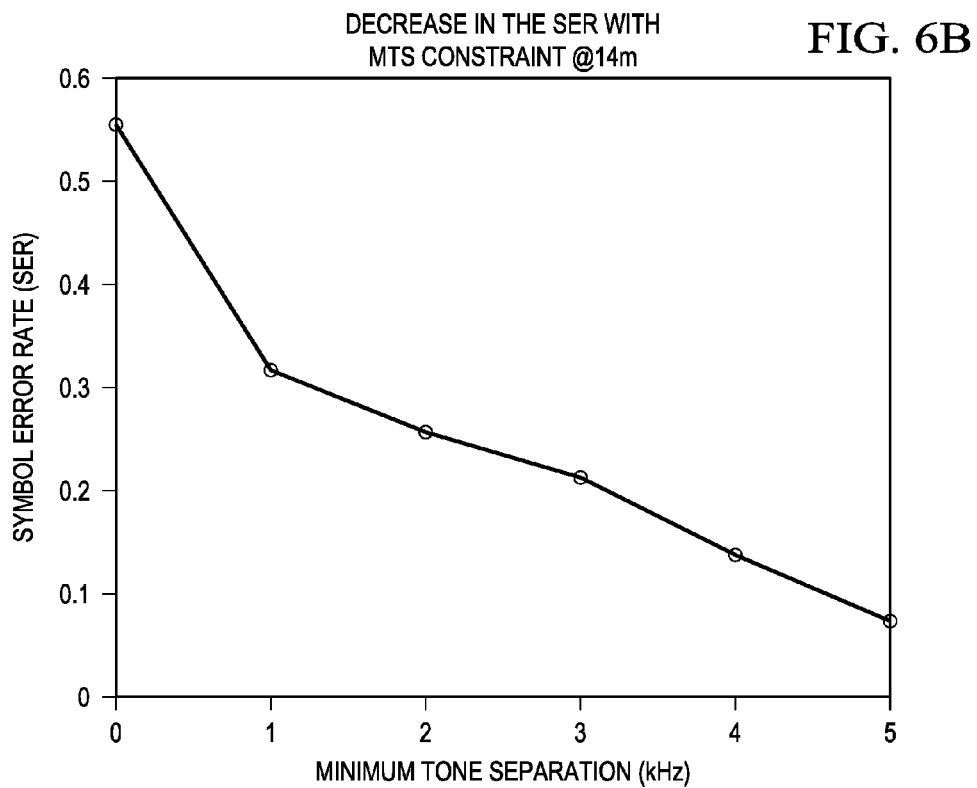
FIG. 6B is a diagram showing symbol error rate (SER) as a function of minimum tone separation (MTS) as in FIG. 6A for 14 meter transducer separation.
Figure 6C:
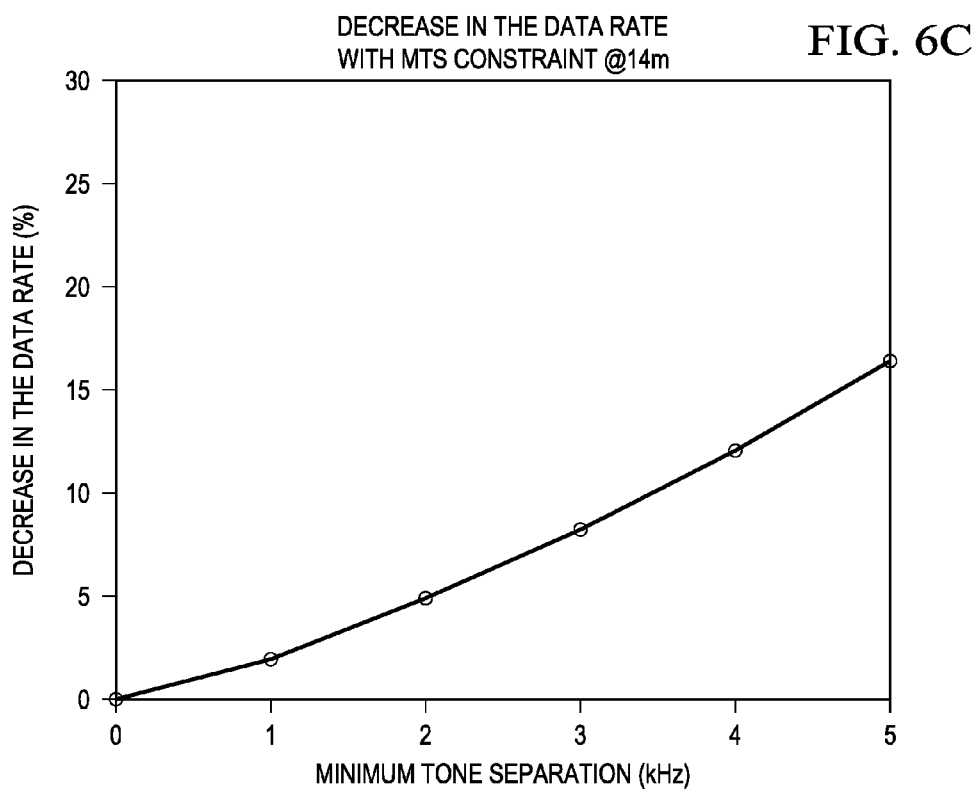
FIG. 6C is a diagram showing a percentage decrease in data rate as a function of minimum tone separation (MTS) as in FIG. 6A for 14 meter transducer separation.

FIG. 6B is a diagram showing symbol error rate (SER) for a transmit/receive transducer separation of 14 meters as a function of minimum tone separation (MTS) as previously discussed with regard to the table of FIG. 6A. Likewise, FIG. 6C is a diagram showing a percentage decrease in data rate for a transmit/receive transducer separation of 14 meters as a function of minimum tone separation (MTS). FIGS. 6B and 6C graphically illustrate significant advantages of the present invention over MFSK systems of the prior art.

Figure 7:
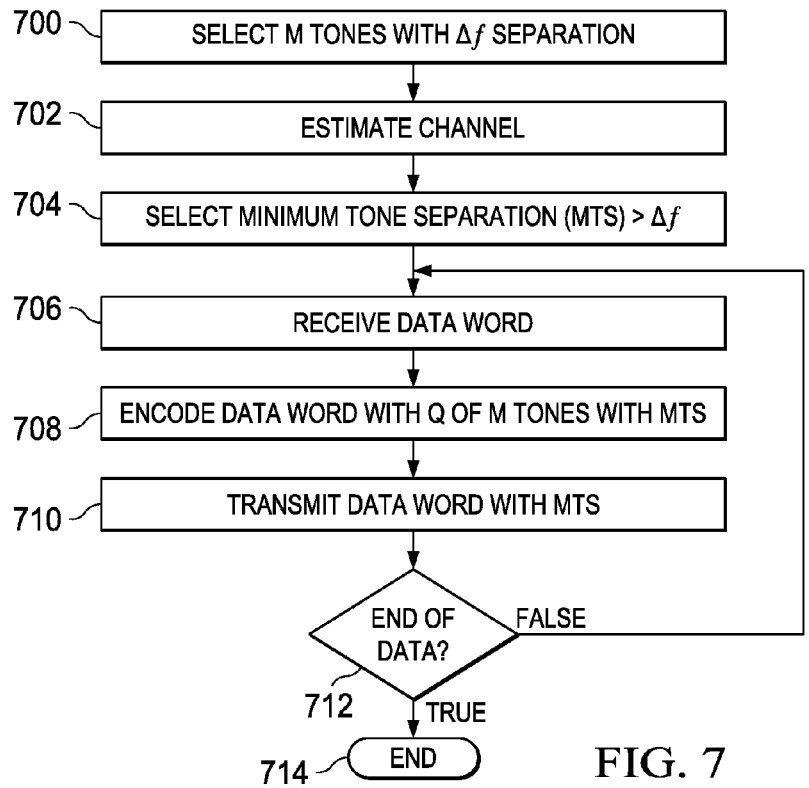
FIG. 7 is a flow chart showing a method of transmitting multitone frequency-shift keyed (MFSK) encoded data with minimum tone separation (MTS) according to the present invention.

Referring now to FIG. 7, there is a flow chart showing a method of transmitting multitone frequency-shift keyed (MFSK) encoded data signals with minimum tone separation (MTS) according to the present invention. The method includes selecting M tones 700, where M is a positive integer. Each of the M tones is generated by an ultrasonic transmitter as in FIG. 4 and has a frequency separation of $\Delta f$. The method includes estimating a channel characteristic 702 of the conducting media through which the MFSK encoded data signals will be transmitted. The channel estimate may be based on the type of conducting media, the length and wall thickness of the media, whether the media is conducting a fluid, whether the media is buried, or other factors that affect the channel characteristic. The channel characteristic may also be estimated empirically by transmitting a known ultrasonic data signal through the media and observing the received signal. Moreover, the known ultrasonic data signal may include a range of frequencies to determine the effect of the multipath fading channel. At step 704, a minimum frequency ($f_{min}$) or tone separation (MTS) greater than $\Delta f$ is selected to minimize side lobe interference as previously discussed. A data word is received at step 706 and encoded at step 708 with a respective set of Q of the M tones. Each of the Q tones in the respective set is separated by at least the selected MTS of step 704. At step 710 the respective set of Q ultrasonic tones representing the encoded data word is transmitted through the conducting media to a remote receiver. Step 712 determines if there is more data to be transmitted. If so, control returns to step 706 to receive the next data word. If not, the method ends at step 714.

Referring next to FIG. 8A, there is a flow diagram showing multitone frequency-shift keyed (MFSK) encoding of data with minimum tone separation (MTS) according to the present invention. Here and in the following discussion, tones and frequencies are used interchangeably. In each case, the following diagrams include indices that will be used to select the tones or frequencies. The diagram begins at block 800 with selection of M tones of frequency set $F_0$ and the MTS $f_{min}$ constraint as previously described with respect to blocks 700-704 of FIG. 7. Block 802 selects Q of the M tones as described at block 708. The selection process of block 802 begins at block 804 where a first of Q frequencies $f^1$ is selected from set $F_1$ such that a difference between current frequency f and first frequency $f^1$ is greater than MTS constraint $f_{min}$. Next at block 806, the second of Q frequencies $f^2$ is selected from set $F_2$ such that a difference between current frequency f and second frequency $f^2$ is greater than MTS constraint $f_{min}$. The process continues and at block 808 the frequency $f^{Q-1}$ is selected from set $F_{Q-1}$ such that a difference between current frequency f and frequency $f^{Q-1}$ is greater than MTS constraint Finally, frequency $f^Q$ is selected from $F_{Q-1}$ such that a difference between frequency $f^{Q-1}$ and frequency $f^Q$ is greater than MTS constraint $f_{min}$. Each of the Q selected frequencies $f^1$ through $f^Q$ is applied to a selected sine wave generator. The resulting Q sine waves are then summed at circuit 812 to produce an MTS constrained MFSK signal.

Figure 8B:
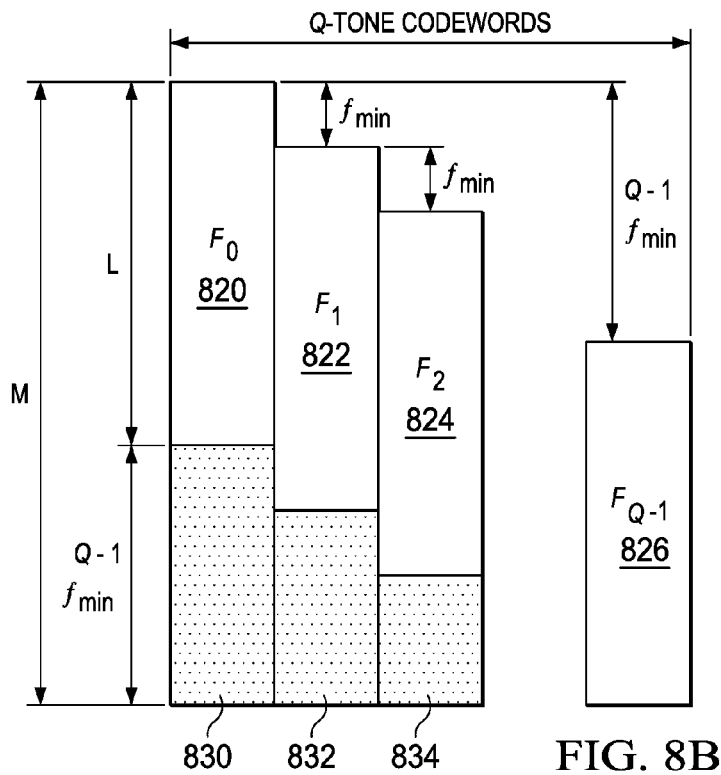
FIG. 8B is a frequency diagram corresponding to the flow diagram of FIG. 8A.

FIG. 8B is a frequency diagram corresponding to the flow diagram of FIG. 8A. There are M available tones or frequencies along the vertical axis. Each Q-tone codeword is selected from a unique combination of frequency sets $F_0$ 820, $F_1$ 822, $F_2$ 824, through $F_{Q-1}$ 826. Each tone of a Q-tone codeword is separated from other tones of the codeword by at least $f_{min}$ as indicated by the offset of each frequency set. Therefore, only L tones from each frequency set may be used, where L is defined by equation [1] and $n_{min}$ is an integer difference of indices corresponding to $f_{min}$.

$$L = M - n_{min} \times (Q-1) \qquad [1]$$

Each frequency set includes an unused set of tones as indicated by shaded regions 830-834. For example, frequency set $F_0$ 820 includes L used tones and $(Q-1) \times f_{min}$ unused tones 830. The unused tones of the M available tones in each frequency set permit the $f_{min}$ frequency separation in each Q-tone codeword. A total of T Q-length codewords, therefore, may be formed subject to an $n_{min}$ MTS constraint as shown at equation [2] as will be explained with reference to FIGS. 9A and 9B.

$$T = \sum_{i=1}^{L} n_{i,1} \quad [2]$$

Figures 9A, 9B, 9C:
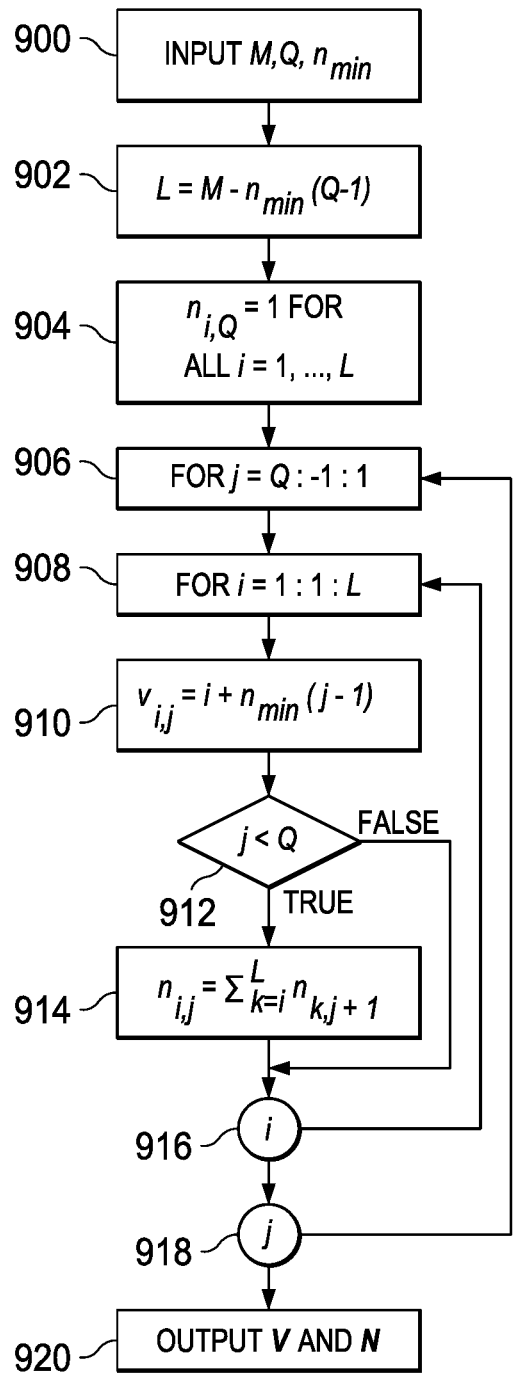
FIG. 9A is a flow chart showing construction of matrices V and N.
FIGS. 9B and 9C are respective diagrams of matrices V and N.

FIG. 9A is a flow chart showing construction of matrices V and N, as shown at respective FIGS. 9B and 9C. Each of matrices V and N have L rows and Q columns corresponding to the L used frequencies of each frequency set and the Q tones of each codeword. Matrix V, having elements $v_{i,j}$, and matrix N, having elements $n_{i,j}$, form a trellis for encoding each message m, as will be discussed in detail. The flow chart begins at block 900 where M, Q, and $n_{min}$ are input. At block 902, L is calculated according to equation [1], and $n_{i,Q}$ is set to 1 for all i from 1 to L at block 904. Index j is initialized at block 906 to Q at an outer loop structure that terminates at block 918 and decrements j by 1 until it is equal to 1. Index i is initialized at block 908 to 1 at an inner loop structure that terminates at block 916 and increments i by 1 until it is equal to L. Block 910 computes matrix elements $v_{i,j}$ for matrix V. Block 914 computes matrix elements $n_{i,j}$ for matrix N if index j is less than Q according to test 912. Completion of the nested loop structure produces matrices V and N at block 920 as shown at respective FIGS. 9B and 9C.

Figure 10A:
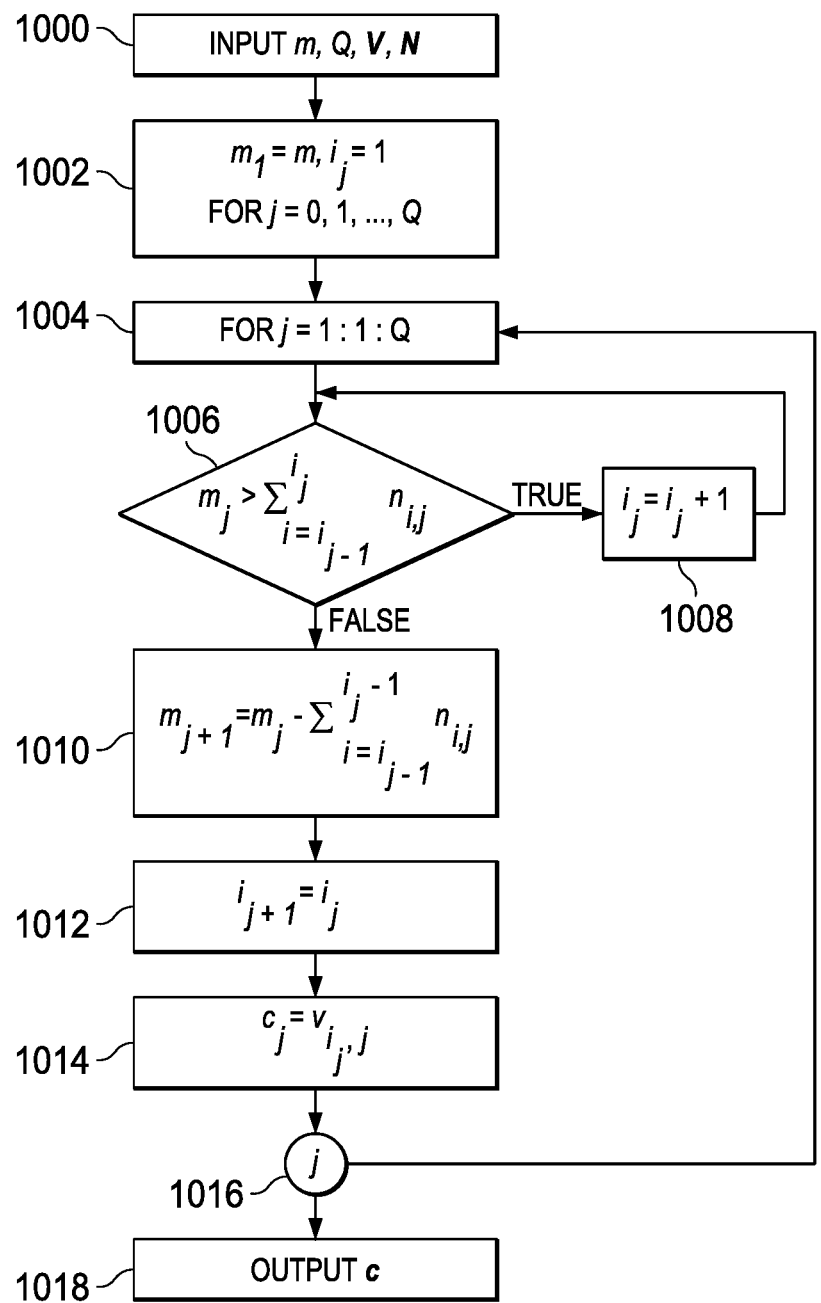
FIG. 10A is a flow chart showing encoding a message with matrices V and N.

Turning now to FIG. 10A, there is a flow chart showing encoding a message m with matrices V and N from FIGS. 9A through 9D. In the following examples, M=6 available tones, $n_{min}$=2, L=2 (equation [1]), matrices V and N are 2×3, and message m=3. The flow chart begins at block 1000 where m, Q, and matrices V and N are input. Operation of the flow chart will now be explained with reference to the flow diagram of FIG. 10B. The flow chart begins at block 1000 where message m, codeword length Q, and matrices V and N are input. At block 1002, variable $m_1$ is set to message m, which is 3 for this example as shown at level 1 of FIG. 10B. Index $i_j$ is initially set to 1 for all j from 0 to Q=3. At block 1004, a loop begins with index j incremented from 1 to Q by increment 1. On a first pass through the loop, test 1006 determines whether $m_1$=3 is greater than a sum, which is only element $n_{1,1}$=3. The result is false (F), and control passes to block 1010. Here, the initial value of i=1 is greater than the final value of i=0, so the sum of $n_{1,1}$ is set to 0. Thus, $m_2$ is set to $m_1$ as shown at level 2 of FIG. 10B. At block 1012, $i_2$ is set to $i_1$=1. At block 1014, the first element of codeword c is set to $c_1=v_{1,1}$=1. Node 1016, terminates the first pass through the loop, and control passes to block 1004 where j is incremented to 2.

On a second pass through the loop, test 1006 determines whether $m_2$=3 is greater than a sum, which is only element $n_{1,2}$=2. The result is true (T), and control passes to block 1008. Index $i_2$ is incremented to 2 and control passes to test 1006. Now test 1006 determines whether $m_2$=3 is greater than a sum of $n_{1,2}+n_{2,2}$=3. The result is false (F), and control passes to block 1010. Here, $m_3$ is set to $m_2-2$=1, as shown at level 3 of FIG. 10B. At block 1012, $i_3$ is set to $i_2$=2. At block 1014, the second element of codeword c is set to $c_2=V_{2,2}$=4. Node 1016, terminates the second pass through the loop, and control passes to block 1004 where j is incremented to 3.

On a third pass through the loop, test 1006 determines whether $m_3$=1 is greater than a sum, which is only element $n_{2,3}$=1. The result is false (F), and control passes through unused blocks 1010 and 1012 to block 1014. Here, the final element of codeword c is set to $c_3=v_{2,3}$=6. Node 1016, terminates the loop, and control passes to block 1018 where codeword c is output. Thus, the set Q {1,4,6} of M frequencies are encoded for transmission by the circuit of FIG. 8A through a conductive media via an ultrasonic transducer to a remote receiver.

Figure 10B:
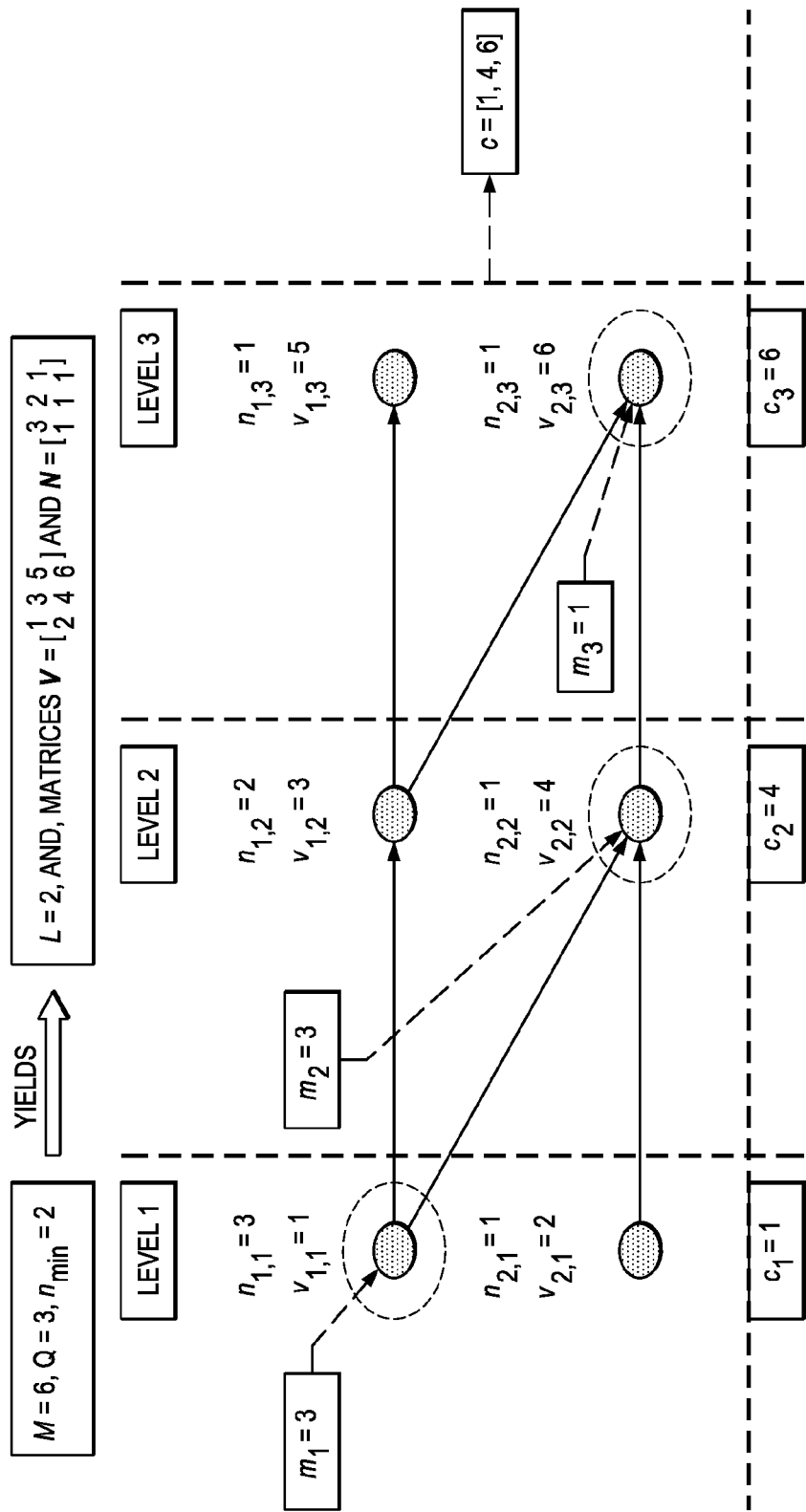
FIG. 10B is a flow diagram showing encoding of a message according to the flow chart of FIG. 10A.
Figure 11A:
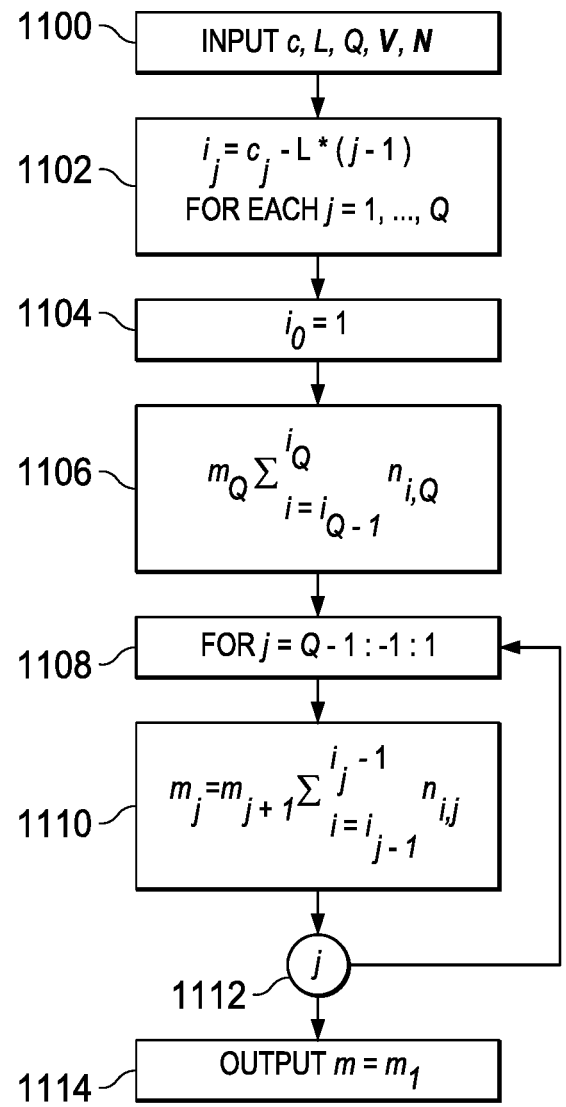
FIG. 11A is a flow chart showing decoding a message with matrices V and N.
Figure 11B:
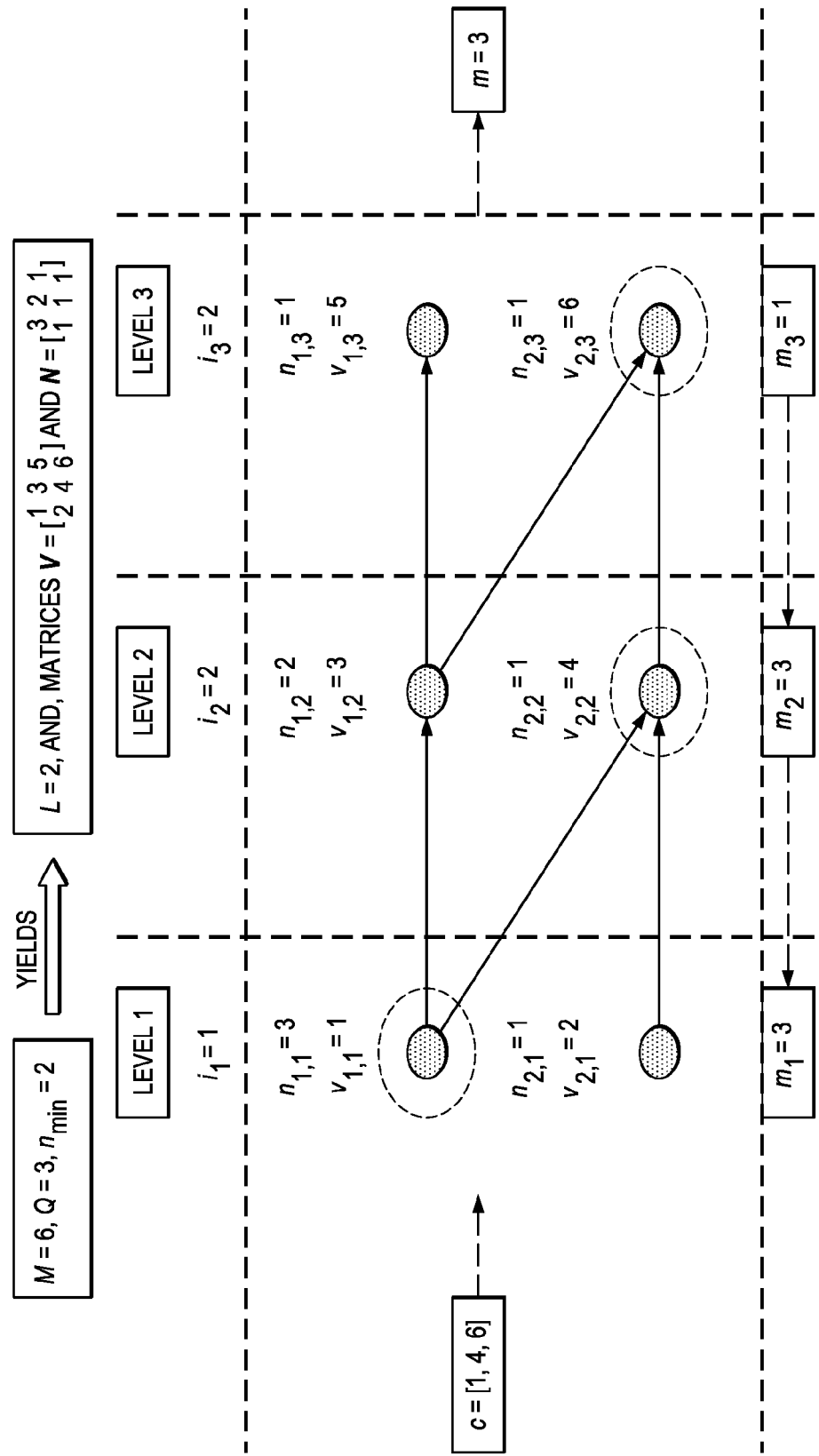
FIG. 11B is a flow diagram showing decoding of a message according to the flow chart of FIG. 11A.

Referring now to FIG. 11A, there is a flow chart showing back propagation decoding by an ultrasonic receiver of the codeword c that was encoded as discussed with regard to FIGS. 10A and 10B. Operation of the flow chart will now be explained with reference to the flow diagram of FIG. 11B. The flow chart begins at block 1100 where c, L, Q, and matrices V and N are input. Codeword c is received by the ultrasonic receiver via an ultrasonic transducer attached to the conductive media. Matrices V and N are calculated by the receiver in the same manner as previously described with reference to FIGS. 9A and 9B. Indices $i_1$ through $i_3$ are initially set to 1, 2, and 2, respectively. At block 1104, index $i_0$ is set to 1. At block 1106, $m_3$ is set to $n_{2,3}$=1 as shown at level 3 of FIG. 11B. At block 1108, a loop begins with index j initially set to Q−1=2 and decreasing to 1 by decrement −1. On a first pass through the loop, block 1110 sets $m_2$ to $m_3+n_{1,2}+n_{2,2}$=3, as shown at level 2 of FIG. 11B. Node 1112, terminates the first pass through the loop, and control passes to block 1108 where j is incremented to 1. On the second and final pass through the loop, block 1110 sets $m_1$ to $m_2+n_{1,1}$=3, as shown at level 1 of FIG. 11B. Node 1112, terminates the final pass and control passes to block 1114, where message m is set to $m_1$=3. Original message m=3 is output to complete decoding.

The foregoing embodiments of the present invention advantageously provide multitone frequency-shift keyed (MFSK) communication with minimum tone separation (MTS). Another embodiment of the present invention describes an efficient trellis-based encoding algorithm using forward propagation. Yet another embodiment of the present invention describes an efficient trellis-based backward propagation decoding algorithm. Embodiments of the present invention greatly improve SER for all transmit/receive transducer separation distances. Side lobe interference of adjacent tones subject to the MTS constraint are greatly reduced. Data throughput may be slightly reduced or may even be improved with the improved SER. Encoding and decoding algorithms provide efficient communication with minimal computational complexity.

Still further, while numerous examples have thus been provided, one skilled in the art should recognize that various modifications, substitutions, or alterations may be made to the described embodiments while still falling within the inventive scope as defined by the following claims. Other combinations will be readily apparent to one of ordinary skill in the art having access to the instant specification.

The invention claimed is:

1. A method of encoding a data signal, comprising:
   selecting a set of M ultrasonic frequencies, wherein each of the M frequencies differs from an adjacent frequency by at least a first frequency spacing, and wherein M is a positive integer;
   forming a trellis matrix; and
   encoding the data signal with the trellis matrix to form a set of Q of the M ultrasonic frequencies, wherein Q is a positive integer less than M, and wherein a minimum frequency separation between any pair of the Q frequencies of the set is greater than the first frequency spacing.

2. The method of claim 1, wherein the trellis matrix comprises a set of admissible codewords, each codeword comprising a respective set of Q of the M ultrasonic frequencies.

3. The method of claim 1, comprising sequentially selecting each frequency of the set of Q frequencies to form a codeword.

4. The method of claim 1, comprising sequentially selecting each frequency of the set of Q frequencies by forward propagation through the trellis matrix.

5. The method of claim 1, wherein each data signal is an N-bit data word, wherein N is a positive integer, and wherein N is less than an integer part of $$\log_2 \binom{M}{Q}.$$

6. The method of claim 1, wherein the minimum separation between any pair of the Q frequencies is $n_{min}$ of the M frequencies.

7. The method of claim 6, wherein each of the Q frequencies is selected from a respective set of L of the M frequencies, wherein $L=M-n_{min}(Q-1)$.

8. The method of claim 1, wherein each of the Q frequencies is selected from a respective set of L of the M frequencies, wherein L is a positive integer, and wherein the trellis comprises a first L×Q matrix of admissible codewords.

9. The method of claim 8, wherein the trellis comprises a second L×Q matrix, each element of the second L×Q matrix indicating a number of codewords that begin with a respective letter.

10. A method of decoding a set of Q frequencies, comprising:
    selecting a set of M ultrasonic frequencies, wherein each of the M frequencies differs from an adjacent frequency by at least a first frequency spacing, and wherein M is a positive integer;
    forming a trellis matrix;
    receiving the set of Q of the M ultrasonic frequencies, wherein Q is a positive integer less than M, and wherein a minimum frequency separation between any pair of the Q frequencies of the set is greater than the first frequency spacing; and
    decoding the set of Q frequencies with the trellis matrix to form a data signal.

11. The method of claim 10, wherein the set of Q frequencies comprises a codeword.

12. The method of claim 10, wherein the trellis matrix comprises a set of admissible codewords, each codeword comprising a respective set of Q of the M ultrasonic frequencies.

13. The method of claim 10, comprising decoding the codeword by backward propagation through the trellis matrix.

14. The method of claim 10, wherein the data signal is an N-bit data word, wherein N is a positive integer, and wherein N is less than an integer part of $$\log_2 \binom{M}{Q}.$$

15. The method of claim 10, wherein the minimum separation between any pair of the Q frequencies is $n_{min}$ of the M frequencies.

16. The method of claim 15, wherein each of the Q frequencies is selected from a respective set of L of the M frequencies, wherein $L=M-n_{min}(Q-1)$.

17. The method of claim 10, wherein each of the Q frequencies is from a respective set of L of the M frequencies, wherein L is a positive integer, and wherein the trellis comprises a first L×Q matrix of admissible codewords.

18. The method of claim 17, wherein the trellis comprises a second L×Q matrix, each element of the second L×Q matrix indicating a number of codewords that begin with a respective letter.

19. An ultrasonic encoding circuit, comprising:
    a plurality of sine wave generators arranged to produce a respective plurality of M ultrasonic frequencies, wherein each of the M frequencies differs from an adjacent frequency by at least a first frequency spacing, and wherein M is a positive integer; and
    an encoder arranged to encode a data signal to form a set of Q signals to select Q of the sine wave generators, wherein Q is a positive integer less than M, and wherein a minimum frequency separation between any pair of the Q selected sine wave generator frequencies of the set is greater than the first frequency spacing.

20. The ultrasonic encoding circuit of claim 19, comprising a trellis matrix of admissible sets of Q frequency select signals.

\* \* \* \* \*